Feb. 9, 1932.  W. N. BOOTH  1,844,458
WIRE WHEEL
Filed June 18, 1928
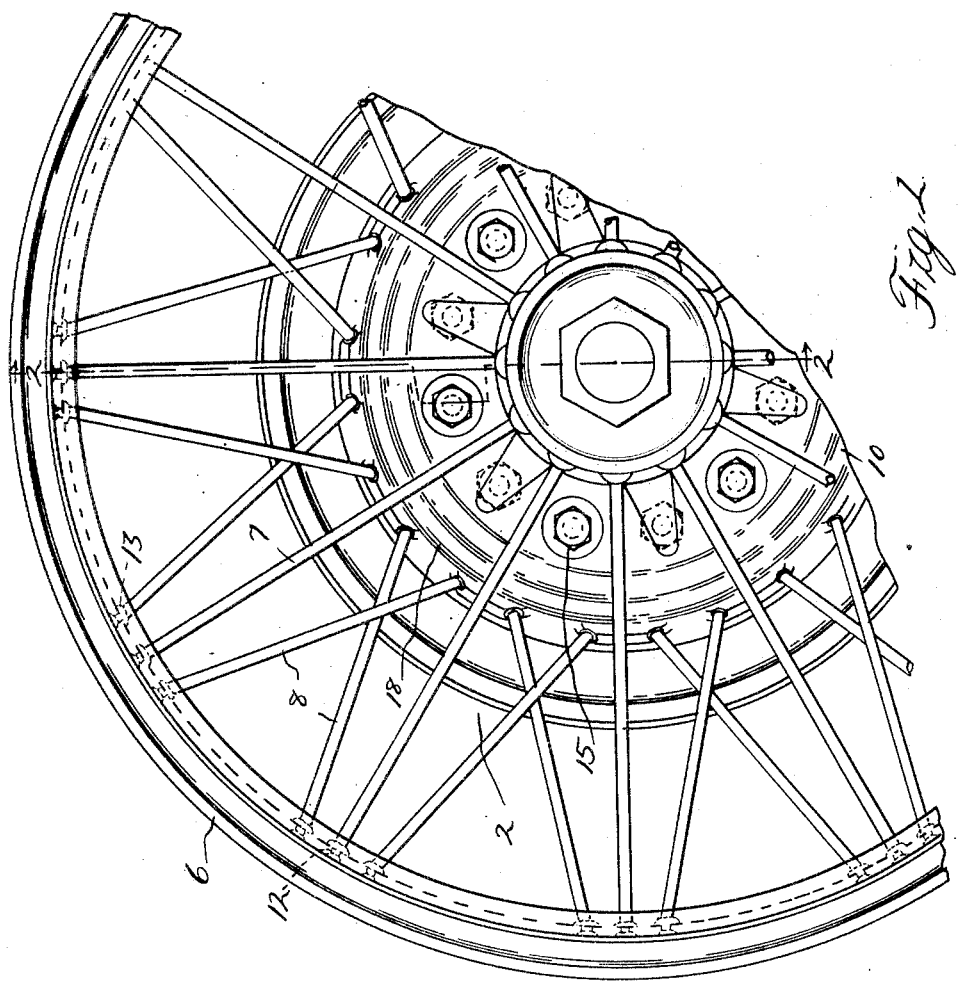
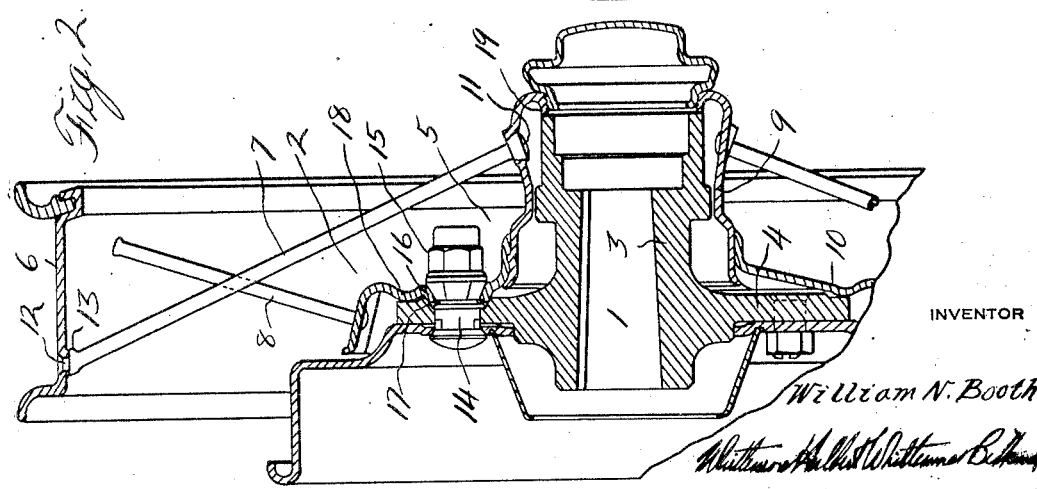
INVENTOR
William N. Booth
ATTORNEYS Patented Feb. 9, 1932

1,844,458

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

WIRE WHEEL

Application filed June 18, 1928. Serial No. 286,408.

The invention relates to vehicle wheels and refers more particularly to the demountable type. The invention resides in the novel arrangement for flexing the outer hub member when mounting the wheel body upon the inner hub member. The invention further resides in the novel features of construction as more fully hereinafter set forth.

In the drawings:—

Figure 1 is a front elevation of a portion of the vehicle wheel, embodying my invention;

Figure 2 is a cross section on the line 2—2 of Figure 1.

The wheel shown in the present instance is a suspension wire wheel to which the invention is particularly applicable. This wheel has the inner hub member 1 and the wheel body 2, which is adapted to be mounted upon the inner hub member. The inner hub member has the barrel 3 and the fixed radial flange 4 and the wheel body comprises the outer hub member 5, the rim member 6 and the sets of front and rear spokes 7 and 8, respectively. The outer hub member has the barrel 9 and the radial flange 10 at the rear end of the barrel, this barrel and flange being preferably formed of sections drawn from sheet metal which are telescopically engaged and rigidly secured together. The front and rear spokes are respectively connected to the barrel 9 and flange 10 by means of the heads 11 at the inner ends of these spokes. The front and rear spokes are also connected to the rim member 6 by riveting over the tenons 12 at the outer ends of these spokes against the outer face of the rim member, there being the enlargements 13 upon the spokes for engaging the inner face of the rim member. Both the heads and enlargements are preformed to provide shoulders at fixed distances apart so that the outer hub and rim members are concentrically positioned relative to each other in the completed wheel body.

For securing the wheel body to the inner hub member I have provided the bolts 14 and the nuts 15, the bolts extending axially of the wheel and transversely through the radial flanges 4 and 10. The flange 10 is provided with the tapered tubular projections 16 which are engageable in the correspondingly tapered recesses or pockets 17 formed in the front face of the radial flange 4 and the nuts have tapered ends engaging the driving projections. These projections and recesses or pockets cooperate both to drive the wheel body with the inner hub member and to transmit the radial load upon the inner hub member to the wheel body. The radial flange 10 also has the annular rib 18 outwardly beyond the projections and adapted to engage the front face of the radial flange 4 near its outer edge. The front end portion of the barrel 9 of the outer hub member terminates in the rearwardly extending axial flange 19, which is located in advance of the barrel 3 of the inner hub member and is adapted to engage its front end prior to engagement of the annular rib 18 of the outer hub member, this annular rib in turn being adapted to engage the radial flange 4 prior to engagement of the driving projections 16 upon the outer hub member with their driving pockets 17 in the radial flange 4. As a result, upon mounting the wheel body upon the inner hub member rearward movement of the wheel body is limited by reason of the rearwardly extending flange 19 of the outer hub member contacting with the front end of the barrel 3 of the inner hub member, so that upon further tightening up of the nuts 15 the outer hub member is flexed, first engaging its annular rib with the radial flange of the inner hub member, and next engaging its projections with the recesses or pockets of the radial flange of the inner hub member. With this arrangement the spoke engaging portions upon the barrel and flange of the outer hub member are axially separated to effect tensioning of the spokes and furthermore the tubular projections assist in locking the nuts from disengagement from their bolts.

What I claim as my invention is:

1. In a vehicle wheel, an inner hub member having a barrel and a transverse flange, a flexible outer hub member having a barrel and a transverse flange at the rear end of said last mentioned barrel, said last mentioned barrel being provided at its front end with an inwardly extending portion for engaging the front end of said first mentioned barrel, said transverse flange and inwardly extending portion of said outer hub member having contact faces normally spaced apart a less distance than the corresponding contact faces upon said transverse flange and the front barrel end of said inner hub member, and means engaging said flanges for securing said outer hub member upon said inner hub member and bringing said contact faces into engagement.

2. In a vehicle wheel, an inner hub member having a barrel and a transverse flange, a flexible outer hub member having a barrel and a transverse flange at the rear end of said last mentioned barrel, said last mentioned barrel being provided at its front end with a return-bent and rearwardly extending axial portion having an end for engaging the front end of said first mentioned barrel, said transverse flange and axial portion end having contact faces normally spaced apart a less distance than the corresponding contact faces upon said transverse flange and the front barrel end of said inner hub member, and means engaging said flanges for securing said outer hub member upon said inner hub member and bringing said contact faces into engagement.

In testimony whereof I affix my signature.

WILLIAM N. BOOTH.